(No Model.)

G. VALLEY.
SWITCH FOR STREET CAR CONTROLLERS.

No. 536,795. Patented Apr. 2, 1895.

Witnesses.
Louis P. Abell.
Roland Rider.

Inventor.
Gustaf Valley
by C. M. Vore
Attorney.

UNITED STATES PATENT OFFICE.

GUSTAF VALLEY, OF CLEVELAND, OHIO, ASSIGNOR TO THE STEEL MOTOR COMPANY, OF SAME PLACE.

SWITCH FOR STREET-CAR CONTROLLERS.

SPECIFICATION forming part of Letters Patent No. 536,795, dated April 2, 1895.

Application filed December 3, 1894. Serial No. 530,654. (No model.)

*To all whom it may concern:*

Be it known that I, GUSTAF VALLEY, a citizen of the United States, residing at Cleveland, in the county of Cuyahoga and State of Ohio, have invented certain new and useful Improvements in Switches for Street-Car Controllers; and I do hereby declare the following to be a full, clear, and exact description of the invention, such as will enable others skilled in the art to which it appertains to make and use the same.

My invention relates to switches for street car controllers. Its object is to improve the construction and increase the efficiency and adaptability of the device, and it consists in the construction, combination and arrangement of parts to secure such objects, as hereinafter described and specifically pointed out in the claims.

Figure 1:
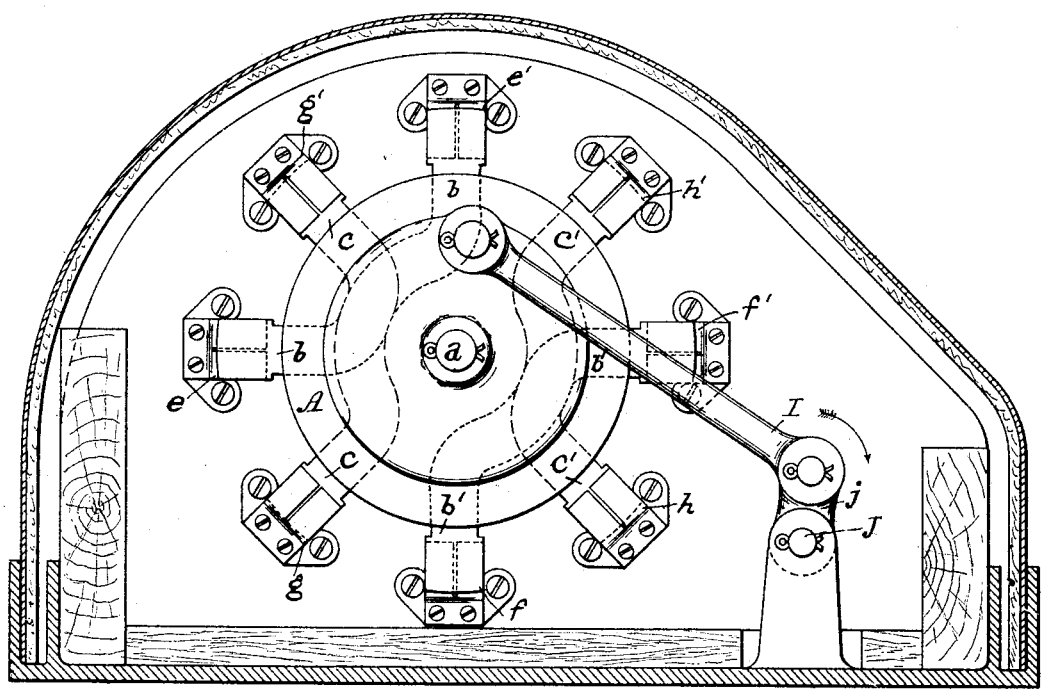
Figure 2:
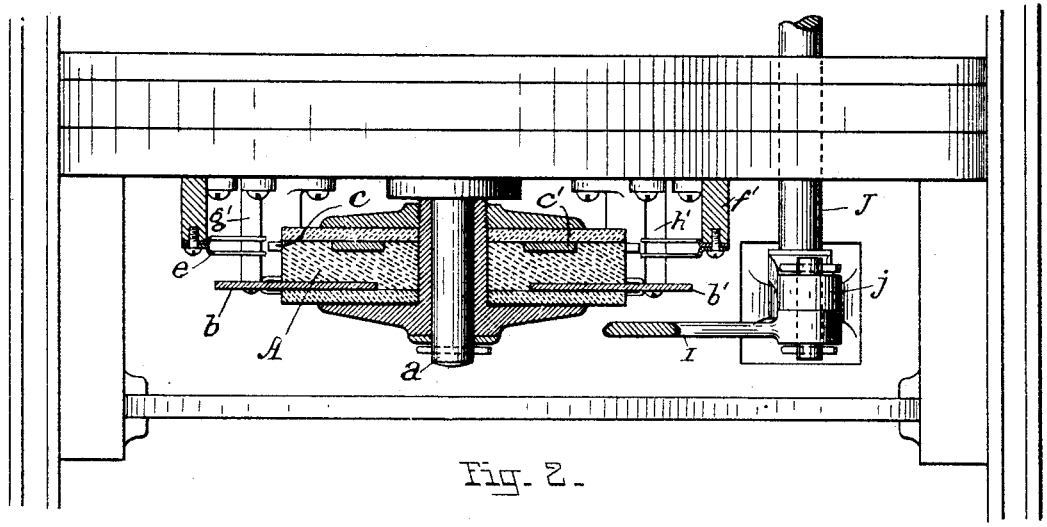

In the drawings Figure 1 represents, in plan view, and Fig. 2 in central vertical section, a switch constructed according to my invention.

A represents the body of the switch, composed of insulating material, supported on a pivot $a$, and having embedded in or secured upon it the double ended contact points $b\, b'$, $c\, c'$, forming an eight point switch. Adjusted around the switch at proper distances and at the proper level are spring-contacts $e\, e'$, $f\, f'$, $g\, g'$, $h\, h'$, each in conductive relation to a conductor forming a particular part of the circuit as hereinafter described.

A pitman I connects the switch A to a crank $j$ on the shaft J by which the switch is operated, which crank is provided with the usual index-handle (not shown).

In the position shown in Fig. 1 the switch may be supposed to be set to send the current through the motors in the forward direction when the circuit is closed by the controller. The stationary spring contacts are connected as follows: $e$ to the trolley, $e'$ to the positive side of the first motor, $f$ to the negative side of the same motor, $f'$ and $g$ to the controller, $g'$ to the positive side of the second motor, $h$ to the negative side of the same motor, and $h'$ to the ground. In the position shown the current will, when circuit is made at the controller, flow from the trolley by way of $e\, b$ and $e'$ through the first motor and back through $f\, b'$ and $f'$ to the controller, thence through $g\, c$ and $g'$ to the second motor and back through $h\, c'$ and $h'$ to the ground, moving the car ahead by the combined power of the two motors in series. Reversing the switch is effected by turning the same one quarter around, as by rotating the shaft J in the direction indicated by the arrow. The contact $b$ will then connect $e'$ and $f'$, $b'$ will connect $e$ and $f$, while $c$ will connect $g'$ and $h'$, and $c'$ will connect $g$ and $h$. On now completing the circuit by means of the controller, the current from the trolley entering at $e$ will go through $b'$ and $f$ to the negative side of the first motor, thence through the motor, the contact $e'$, the switch arm $b$, contact $f'$, and the controller through $g\, c'$ and $h$ to the negative side of the second motor, and through the same, thence through $g'\, c$ and $h'$ to the ground, thus connecting the motors in series in the reversed direction, and consequently backing the car. Obviously the switch can be made to turn in either direction by properly arranging the connections of the spring contacts $e\, e'\, f$, &c. When the switch is turned one eighth around the points of the contacts $b, b', c, c'$ of course come opposite to the contacts $g'\, h'$, $g\, h$, $e\, e'$ and $f\, f'$ respectively, but at a different level, as seen in Fig. 2, so that the circuit is completely broken. The contacts $e\, e'\, f\, f'$, &c., are alternately on different levels, that is, four on each level, so that on breaking contact nothing less than a full quarter turn of the switch will make contact again. This construction allows a sufficient distance between the contact points to prevent any arcing across of the current in throwing the switch, while at the same time preserving a compactness of the device which is very desirable.

What I claim as my invention, and desire to secure by Letters Patent, is—

1. The combination of a disk of insulating material and means for rotating the same, curved conducting pieces embedded therein at different levels and having both ends protruding to form contact points, the protruding points of different pieces alternating and being alternately at different levels and the spring contacts arranged around the disk in series corresponding to the different levels of the projecting contact points and in position to be engaged by said points as the disk is rotated, substantially as described.

2. The combination, in a multipole switch, of a disk of insulating material and means for rotating the same, curved conducting pieces embedded therein at different levels and having both ends protruding to form contact points, the diametrically opposite conducting pieces being upon the same level and having their points alternating with those of the pieces upon a different level, and the spring contacts arranged around the disk at intervals equal to those of the contact points and in series corresponding to the different levels of the projecting contact points and in position to be engaged by said points as the disk is rotated, substantially as described.

In testimony whereof I hereto affix my signature in presence of two witnesses.

GUSTAF VALLEY.

Witnesses:
P. PRENTISS,
ROLAND RIDER.